United States Patent [19]

Rajasingham

[11] Patent Number: 6,155,519
[45] Date of Patent: Dec. 5, 2000

[54] AIR SLEEPER

[76] Inventor: Arjuna Indraeswaran Rajasingham, Bethesda, Md.

[21] Appl. No.: 08/991,340

[22] Filed: Dec. 16, 1997

[51] Int. Cl.[7] .................................................. B64D 11/06
[52] U.S. Cl. ......................................................... 244/118.6
[58] Field of Search ........................... 244/118.5, 118.6, 244/137.1; 105/316, 314, 315, 322; 5/118

[56] References Cited

U.S. PATENT DOCUMENTS

| | | | |
|---|---|---|---|
| 2,092,655 | 9/1937 | Page, Jr. ................................ | 244/118.6 |
| 2,124,003 | 7/1938 | McDonnel, Jr. et al. ............ | 244/118.6 |
| 2,480,322 | 8/1949 | Cozzoli ................................. | 244/118.6 |
| 2,946,294 | 7/1960 | Murphy ................................. | 244/118.6 |
| 3,784,989 | 1/1974 | LeGrand .................................. | 105/315 |
| 4,071,210 | 1/1978 | Mutke ................................... | 244/118.6 |
| 4,097,008 | 6/1978 | Pender .................................. | 244/137.1 |
| 4,589,612 | 5/1986 | Halim ................................... | 244/118.6 |
| 4,686,908 | 8/1987 | Legrand ................................. | 105/315 |
| 5,372,339 | 12/1994 | Morgan ................................ | 244/118.5 |
| 5,383,629 | 1/1995 | Morgan ................................ | 244/118.6 |
| 5,716,026 | 2/1998 | Pascasio et al. ..................... | 244/118.6 |
| 5,784,836 | 7/1998 | Ehrick ..................................... | 52/79.8 |
| 5,788,183 | 8/1998 | Marechal .............................. | 244/118.6 |
| 5,876,059 | 3/1999 | Kleinberg ............................. | 280/730.1 |

FOREIGN PATENT DOCUMENTS 2623210  1/1978  Germany ............................. 244/118.6

*Primary Examiner*—Peter M. Poon
*Assistant Examiner*—Charles R Ducker, Jr.

[57] ABSTRACT

An arrangement in aircraft that provides a single habitat that allows horizontal sleeping postures as well as other comfortable postures for passengers, with space efficiencies with safety arrangements adequate for all stages of flight. The arrangement can be used to extend the transport of the passengers undisturbed in the same habitats to other vehicles including other aircraft and ground transport vehicles. Moreover airport facilities including baggage handling arrangements may be substantially reduced and concurrently provide passengers with high utility in negotiating ground facilities. The arrangement facilitates the incorporation of new and efficient business systems for efficient allocation of passenger aircraft resources.

28 Claims, 6 Drawing Sheets

AIR SLEEPER

BACKGROUND OF INVENTION

1. Field of Invention

The present invention provides a new structure and passenger transport paradigm for accommodating passengers in aircraft with particular attention paid to the need to sleep comfortably on long flights while maintaining passenger safety standards, discretionary posture changes for passengers and efficiently utilizing cabin space.

2. Description of the Related Art

Passenger aircraft have evolved since their invention by the Wright brothers, from the single seat vehicle to the giant passenger aircraft of today, with little change in the flexibility of passenger posture or positioning. Moreover as a result, there has been little incremental efficiency that has been possible in the process of embarking and disembarking the aircraft and for major changes in safety arrangements in the event of a crisis. The governing paradigm for passenger aircraft design is that there should be seats that passengers are assigned to and this becomes their "habitat" during the flight with some movement in the cabin permitted. Movement though is not always easy particularly in the Economy cabins of such aircraft where seats are closely spaced to maximize space utilization. As a result only "aisle passengers" get access to easy movement. Second, such closely spaced seats prevent the possibility of horizontal positioning of the seats except with the less efficient spacing that First and possibly Business class offer.

Sleep on an aircraft in the current context is an important consideration particularly in trans-continental flights that could take anywhere from five hours to over twenty hours in the air. Many passengers avoid travel rather than sleep on "red eye" flights.

Ehrick U.S. Pat. No. 5,784,836 (1998) describes a system where a set of container modules in the hold of an aircraft may be refurbished to create individual habitats including bunks and other facilities for a few passengers at a time. The only connection to the aircraft cabin is the passageway for access. The arrangement is not designed to accommodate passengers at take off and landing (Col 4, line 26) presumably as the necessary safety issues under those conditions are not considered. Secondly there is a separate space allocated for the sleeping arrangements to the passenger habitat—the seats. Morgan U.S. Pat. Nos. 5,383,629 (1995) and 5,372,339 (1994) describe an emergency medical system that transports patients on bunks that may be inclined and raised or lowered. There is no adjustment for posture or orientation of the patients. The arrangement can however be modified to accommodate sitting passengers or patients in a different alternative configuration. There are however, no arrangements for discretionary changes in posture by passengers. Halim U.S. Pat. No. 4,589,612 (1986) describes a system where passengers may be accommodated in a sitting posture or alternatively all passengers may be accommodated in a horizontal sleeping posture. There is no arrangement that allows passengers to choose the orientation or posture they desire without altering the posture of all the other passengers in a module. Mutke U.S. Pat. No. 4,071,210 (1978) describes an arrangement where passengers are accommodated in bunkers that are slidable in racks. He also has a head rest that may be inclined. There are no passenger safety arrangements considered. Further the posture of passengers is limited to horizontal and horizontal except for a raised upper body. Murphy U.S. Pat. No. 2,946,294 (1957) describes arrangements for private compartments in passenger vehicles. These include sleeping areas sitting accommodation, toilet facilities and other amenities. He does not address the current concerns about economy of space in current day passenger aircraft and the safety issues related to current day air travel. Cozzoli U.S. Pat. No. 2,480,322 (1949) describes stretchers arranged in an aircraft for use as an ambulance. The arrangement does not address the safety issues in current day aircraft. Furthermore it does not consider discretionary changes in posture by passengers. McDonnell U.S. Pat. No. 2,124,003 (1938) describes an arrangement for convertible seats to bunk beds in aircraft. He does not address the safety issues of current day aircraft. Moreover the arrangement requires. passengers to coordinate their sleeping arrangements. Page U.S. Pat. No. 2,092,655 (1937) describes a two tier system of bunk beds that can be converted to seats, these may however not meet the space economy constraint or safety needs of contemporary passenger aircraft. Kleinberg U.S. Pat. No. 5,876,059 (1999) describes a vehicle sleeper restraint system that uses an airbag installed in a shelf above the bunker and a detachable fabric or mesh screen or padded wall on the side of the passenger, for secondary collision protection in the event of crashes and roll overs. The system is more appropriate for low velocity vehicles such as recreational vehicles or even low speed trains. Airbag deployment as noted above the passenger is likely to suffocate the passenger. Moreover, the screen or wall structure on the side of the passenger will not provide the targeted energy absorption to the passenger. Moreover, a wall structure will be heavy and unsuitable for aircraft deployment. Finally there is no provision for the passenger to change orientation in the same space with this arrangement. LeGrand U.S. Pat. No. 3,784,989 (1974) describes a geometric arrangement where human forms can be fitted in a position that is explained to be restful. Legrand U.S. Pat. No. 4,686,908 (1987) describes an arrangement for public transport vehicles where bunks are arranged above the seats with two seats to every bunk. The bunks and seats occupy different physical space.

All of the above items of background art related to providing sleeping accommodation in passenger vehicles. None of them provide workable safety arrangements for aircraft particularly during take off and landing. Moreover, none of them provide each passenger with the option for discretionary independent change in posture from a full horizontal sleeping position to a upright sitting position, without incursion into the preferences of other passengers, with these changes in posture in the same habitat with the resulting space economies.

SUMMARY

In view of these prior references what would be useful is an arrangement that provides passengers a single relocatable habitat for transportation in aircraft and other means, that provides adequate safety arrangements under all encountered conditions so that the passenger is not disturbed in the habitat even when transshipped across multiple vehicles. Moreover it would be useful to have this same arrangement provide passengers independent, discretionary changes in posture from a horizontal sleeping posture to an upright sitting posture without incursion into other passenger's preferences, while providing comparable space economies as in passenger aircraft in all classes of travel.

The present invention includes these objects and advantages.

OBJECTS & ADVANTAGES

Some of the objects and advantages of the present invention are, to provide a new structure and passenger transport paradigm for accommodating passengers in a "habitat" in aircraft or other vehicle with particular attention paid to, safety at all stages of flight, while concurrently addressing the need to sleep comfortably on long flights, the need for body movement to ensure good blood circulation[1] on such flights and the need for independent access to all service facilities without being obstructed by other passengers.

[1]Poor blood circulation resulting from restricted movement may cause blood clots/thrombosis that can lead to medical complications and in extreme cases death.

Another object and advantage is easy and stress free terminal arrangements for commencing and ending journeys.

Another object and advantage of the present invention is the greater utilization of aircraft and airport facilities and in some embodiments makes redundant the entire baggage handling facilities and equipment.

Another object and advantage is the architecture of the present invention that defines a system that allows interchangeable utilization of cargo and passenger components in aircraft.

Another object and advantage of the present invention is that it incorporates a new expeditious approach for aircraft crisis management in the event of the need for an emergency evacuation of the aircraft.

Another object and advantage of the present invention is that in addition to the physical structure, a new concept in billing passengers for travel is provided—an approach that is complementary to conventional ticketing for multi-class travel but creates greater efficiency of utilization of resources on the aircraft with appropriate pricing.

LIST OF REFERENCE NUMBERS

Figure 1:
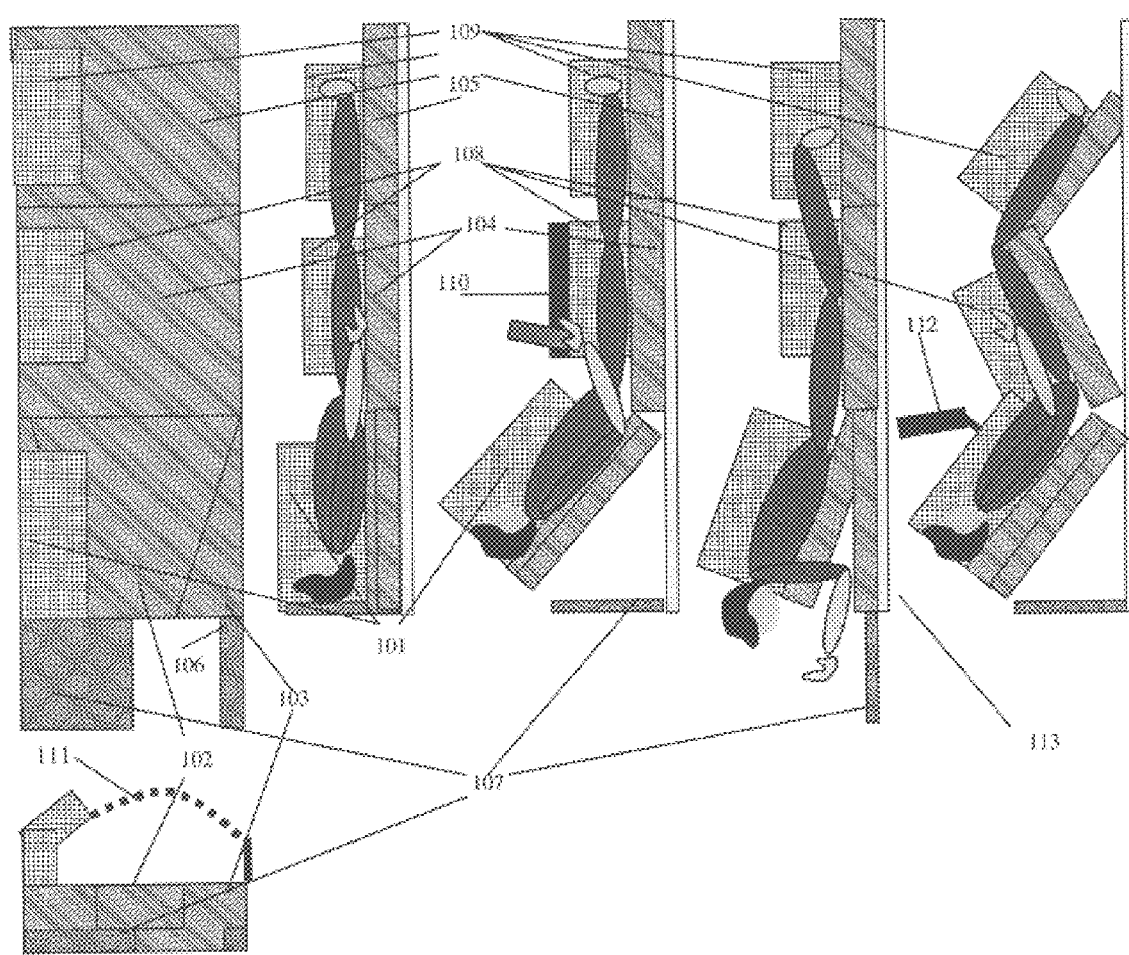
FIG. 1 illustrates several possible positions in an embodiment with the passengers facing inwards with their feet at the center.

101—Upper Safety Bumper
102—Sleeper Upper Section
103—Arm Supports
104—Sleeper Mid Section
105—Sleeper Lower Section
106—Climbing Rung
107—Utility Flap
108—Middle Safety Bumper
109—Lower Safety Bumper
110—Table Top
111—Safety Strap
112—Amenities Console
113—Frame and Support Beams
114—Air Sleeper
115—Seats
116—Aircraft wall
117—Cabin Floor
118—Foot Safety Bumper

DETAILED DESCRIPTION OF INVENTION

The present invention provides a structure for comfortable and convenient travel for passengers principally in aircraft, but also in other modes of transportation. Current passenger aircraft design utilizes as the normal travelling environment for passengers, seats that are capable of reclining to a limited extent. Such seats limit the ability of passengers to sleep in a horizontal position. First because of limited space that is available in this configuration. Allowing conventional seats to recline to a horizontal position would imply that the utilization of space is markedly reduced. Moreover, there could be limited access to some passengers when others are in the horizontal position if such arrangements are possible. Second, there is a serious compromise in safety for passengers lying horizontally facing the direction of flight. In the event of rapid deceleration as in a crash landing, such passenger lap safety belts may not be effective. To meet these challenges, the present invention provides a passenger habitat (environment created by the Air Sleeper) that:

1. Allows passengers to sleep in a horizontal position when desired with no compromises to fellow passengers.
2. Provides a safety structure that will be effective for all stages of flight including take off and landing allowing therefore a design that requires only a single habitat for each passenger with the posture flexibility noted above.
3. Provides in some embodiments a high utilization of space: Provides sleeping accommodation for 90–100 percent of passengers accommodated in conventional economy class seats within the same "footprint" or floor area on an aircraft.
4. Allows independent access to each passenger to his/her Air Sleeper. All Air Sleepers may have aisle access.
5. Allows passengers to sit up or recline when desired without any inconvenience to other passengers.
6. Provides excellent protection in the event of rapid deceleration of the aircraft as in a crash or emergency landing, whatever the position of the passenger at the time on the Air Sleeper. This includes the horizontal sleeping position.

The present invention is accordingly, of particular value for long haul trans-continental and intercontinental flights. The invention does not compromise safety arrangements with the new configuration and in fact may enhance the current level of safety in passenger aircraft utilizing lap belts.

In addition the new passenger transport paradigm in the present invention, defines designated areas in the aircraft for use as lounges. These lounges will effectively segment the passenger market into multiple classes of travel focussing on the key factor for such segmentation—socialization into preferred groups of passengers. To maintain high utilization of space for economy passengers, lounge space may be limited. On the other hand first class passengers may even have dining tables at which meals can be served and spacious lounges for relaxing with company.

The present invention defines a new structural feature in aircraft that provides windows on the upper part of the fuselage which create "Penthouse" Air Sleepers with better external views—Particularly suited for chlostrophobic passengers and premium passengers.

The present invention provides, individualizable services with the Amenities Module and folding tabletop. The Amenities Module in some embodiments provides each passenger with independent access to a controllable air supply, video screen, sound and video headset connections, telephone and intercom within plane for service calls, aircraft status indicators, lights and other amenities.

The present invention defines a structure—the Air Sleeper Family. A structure that has multiple Air Sleepers constructed in groups, and accommodated axially in the fuselage of the aircraft. The construction permits the removal of such Families from the aircraft either by engaging slides on the aircraft floor with rollers/wheels or alternative mechanisms.

The present invention provides a new paradigm for passenger embarkation and disembarkation. Air Sleeper Families may be unlocked and removed from the aircraft and slide or roll into place or out of the aircraft through large axial doors. Such Air Sleeper Families may in some embodiments be boarded in the comfort of airport lounges following security checks. Passengers may then be transported in their Air Sleepers through processing centers for travel formalities and finally transported to the interior of the aircraft where the Air Sleeper Families are locked in place for travel. As a result of these innovations the utilization of the aircraft and the airport facilities are increased. Aircraft structures as defined in this invention are still compatible with airports without the facilities that are defined herein. This invention and its passenger transport paradigm extend to other forms of passenger transport such as trains and busses.

The present invention supports easy conversion of the aircraft for cargo duty and mixed passenger and cargo duty.

Finally, the present invention provides a paradigm that supports a new more efficient market segmentation mechanism as an alternative and complement to the conventional discrete multi-class travel.

The following descriptions are for embodiments of the present invention. Deviations from this description in an embodiment is possible without deviating from the present invention.

PREFERRED EMBODIMENT

The following is a detailed description of some of the components of this first embodiment which is shown in FIG. 1. This figure shows this embodiment in several configurations in side elevation and also the plan and front elevation as well. This embodiment has the passengers facing inwards with their feet at the center of the Air Sleeper Family and their heads at the entrance of the Air Sleeper. There are three sections for the Sleeper: The upper section 102, the mid section 104, and the lower section 105. These three surfaces support the body of the passenger. They may be inclined as noted in FIG. 1. The resulting surface is constructed in sections such that each of them may be oriented to provide positions that are comfortable to the passenger. FIG. 1 illustrates the embodiment of this surface in the components 102, 103, 104 and 105. In these embodiments, these sections are constructed so that a) The upper body and torso, b) The shoulders and arms, c) The upper leg, d) The lower leg are supported. These sections may be inclined to different angles to the passenger's preferences. One of these orientations is one that allows sleep in a horizontal position.

The structure has an improved safety restraint system that is more comfortable and more effective particularly while passengers are reclining or sleeping in a horizontal position. It shall consist of a Safety Bumper constructed in several sections with optional straps/belts constructed over (but not necessarily touching) the passenger's body.

Such Safety Bumpers restrict the motion of the body of the passenger in the event of rapid deceleration and are normally constructed in sections and oriented to provide support to the body as required at times of such deceleration of the aircraft. Such safety bumpers are normally integrated or connected to each of the Air Sleeper sections 102, 104, 105.

The three sections of the safety bumpers are respectively, the Upper Safety Bumper 101, the Middle Safety Bumper 108 and the Lower Safety Bumper 109. The safety bumpers may be in sections that hinge out to a limited extent to support the body broadside in the event of rapid deceleration as shown in the front elevation in FIG. 1.

Safety Straps 111 may be deployed on each of the safety bumpers, but need not be tightened around the passenger or even contact the passenger under normal operation. Such straps if deployed on multisection bumpers will restrict the movement and support the hinged sections of the bumpers in the event of rapid deceleration of the vehicle.

Safety straps/belts may be made with semi rigid materials with high tensile strength to be self supporting away from the passenger's body under normal operation. The safety belts/straps a) Guide the passenger body against the safety bumpers in the event of a rapid deceleration and b) Limit the vertical motion of the passenger body in the event of turbulence. Such safety belts/straps may be integrated with the safety bumpers as shown in FIG. 1. Normal deployment of such straps/belts will be on each safety bumper and fastened on the further side of the Air Sleeper.

Arm Supports 103 on the left and right are separate from the Sleeper Upper Section 102 to support arms when facing out of the air sleeper—for example while eating.

The Utility Flap 107 serves two functions—A Tabletop convenient for eating when in a reclining position, and also a seat when boarding the Air Sleeper. Climbing Rungs 106 are spaced about 18 inches apart and may be folded in when not in use. With that spacing one rung is adequate for boarding the second tier of Air Sleepers. Three rungs will be usually used to board the third tier of Air Sleeper. A Tabletop 110 may fold into the Middle Safety Bumper 108. The Amenities Console 112 may be mounted on the Upper Safety Bumper 101. The entire arrangement rests on a frame and support beams 113 that is designed to provide support for the elements for the Air Sleeper and also provide sliding and hinged support as needed for the positions as shown in FIG. 1.

The Amenities module 112 provides services for each passenger and is installed near the upper boundary of the Air Sleeper. Such modules—for each Air Sleeper and passenger—includes:
1. An independent access to a controllable Air supply
2. Video screen
3. Sound and video headset connections
4. Telephone
5. Video/Audio Intercom within plane for service calls
6. Aircraft status indicators
7. Lights
8. Video Conferencing Camera and hardware
9. Hardware for Local Area Network (LAN) connections within aircraft for passengers to communicate with and video conference each other and the service personnel as desired. This may be configured in some embodiments as an Intranet for the aircraft. Facilities to extend such Local Area network to a Wide Area Network (WAN) gateway for such LAN for worldwide communications including Internet connectivity.

10. Connections for Computer power, LAN connections and telephone jacks.

The Amenities module in this embodiment is mounted on an arm that is supported by the base of Air Sleeper and the Upper Safety Bumper module. FIG. 1 illustrates embodiments of the Amenities Console in item 112. This module may also be mounted on the bottom surface of the Air Sleeper above with pivoting and movable connections.

This embodiment also has a foldable or sliding Table Top 110. Such folding tabletop may be installed to fold into the body of the Upper or Lower Bumper modules. It is important that the design of the support arm is such that the gradient of the bumper module with the horizontal position does not affect the horizontal deployment of the Tabletop. The table top in this embodiment is mounted on the Upper Hinge of the Air Sleeper and receives its slant orientation from the frame and support beams 113 of the air sleeper.

ALTERNATIVE EMBODIMENT

Figure 2:
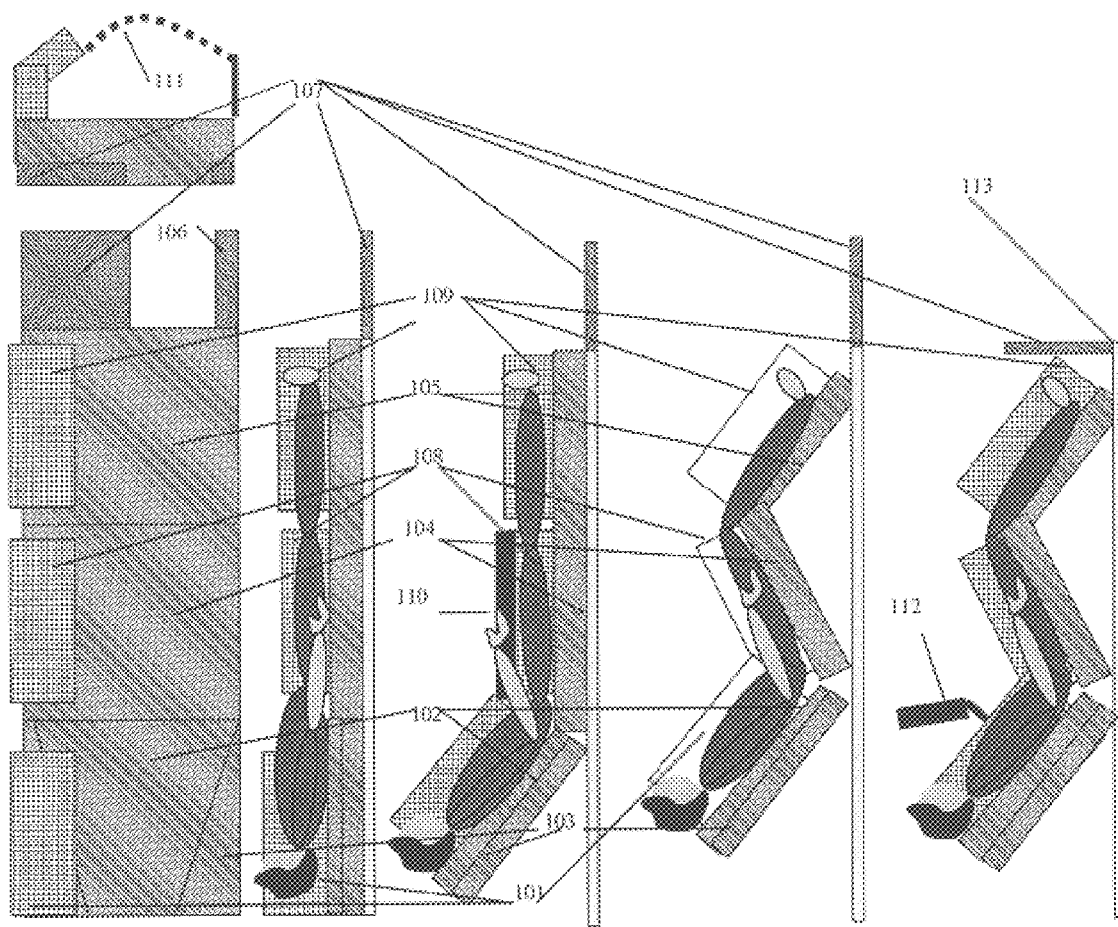
FIG. 2 illustrates several possible positions in an embodiment with the passengers facing outwards with their feet towards the entrance of the air sleeper.

This embodiment is illustrated in FIG. 2 and has all the features of the preferred embodiment except that the passengers face outwards in the Air Sleeper, with their feet at the entrance of the Air Sleeper. There are three sections for the Sleeper: The upper section 102, the mid section 104 and the lower section 105. Similarly there are three sections of the safety bumper: the Upper Safety Bumper 101, the Middle Safety Bumper 108 and the lower Safety Bumper 109. Safety Straps 111 are deployed on each of the safety bumpers, but need not be tightened around the passenger or even contact the passenger under normal operation.

Arm Rests 103 are separate from the Upper Air Sleeper section to support arms when facing into the Air Sleeper Family—for example while conversing with others on the opposite bank of Air Sleepers. The Utility Flap 107 serves two functions—A Tabletop and also a seat when boarding the Air Sleeper. Climbing Rungs 106 may be spaced about 18 inches apart and may be folded in when not in use. With that spacing one rung is adequate for boarding the second tier of Air Sleepers. Three rungs will be usually used to board the third tier of Air Sleeper.

A Tabletop 110 is included. This may fold into the Middle Safety Bumper. The Amenities Console 112 houses necessary services. This is mounted on the Upper Safety Bumper. Some passengers may prefer this embodiment to the preferred embodiment as they may find it easier to get in and out of the Air Sleeper in this arrangement. The construction of the Air Sleeper may be such that both the preferred and alternative embodiment can be at the discretion of each passenger simply be having the top and bottom sections shaped alike with arm rests. Additional arrangements for pivots and slides are well disclosed in the background art.

ADDITIONAL EMBODIMENTS

Figure 5:
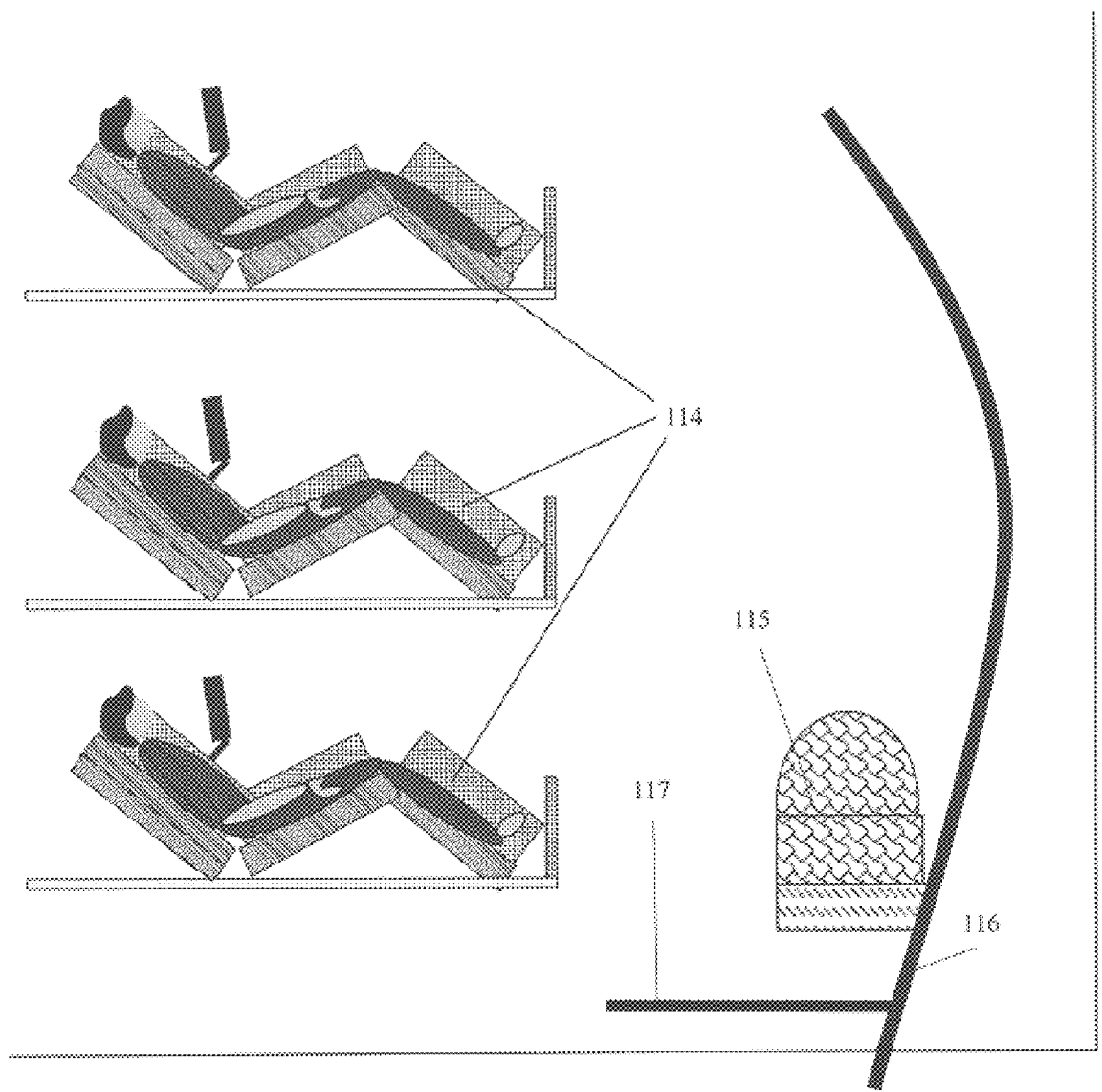
FIG. 5 illustrates the air sleeper embodiment as in FIG. 2 arranged in three tiers showing in addition seats on the outer side of the passenger aisle.

In addition the deployment of air sleepers can be as in the structure illustrated in FIG. 5. Here a three tier deployment of Air Sleepers 114 and shows the relative positions of the Passenger Cabin Floor 117 the seat on the side of the Aisle 115 and the Fuselage wall 116.

Figure 3:
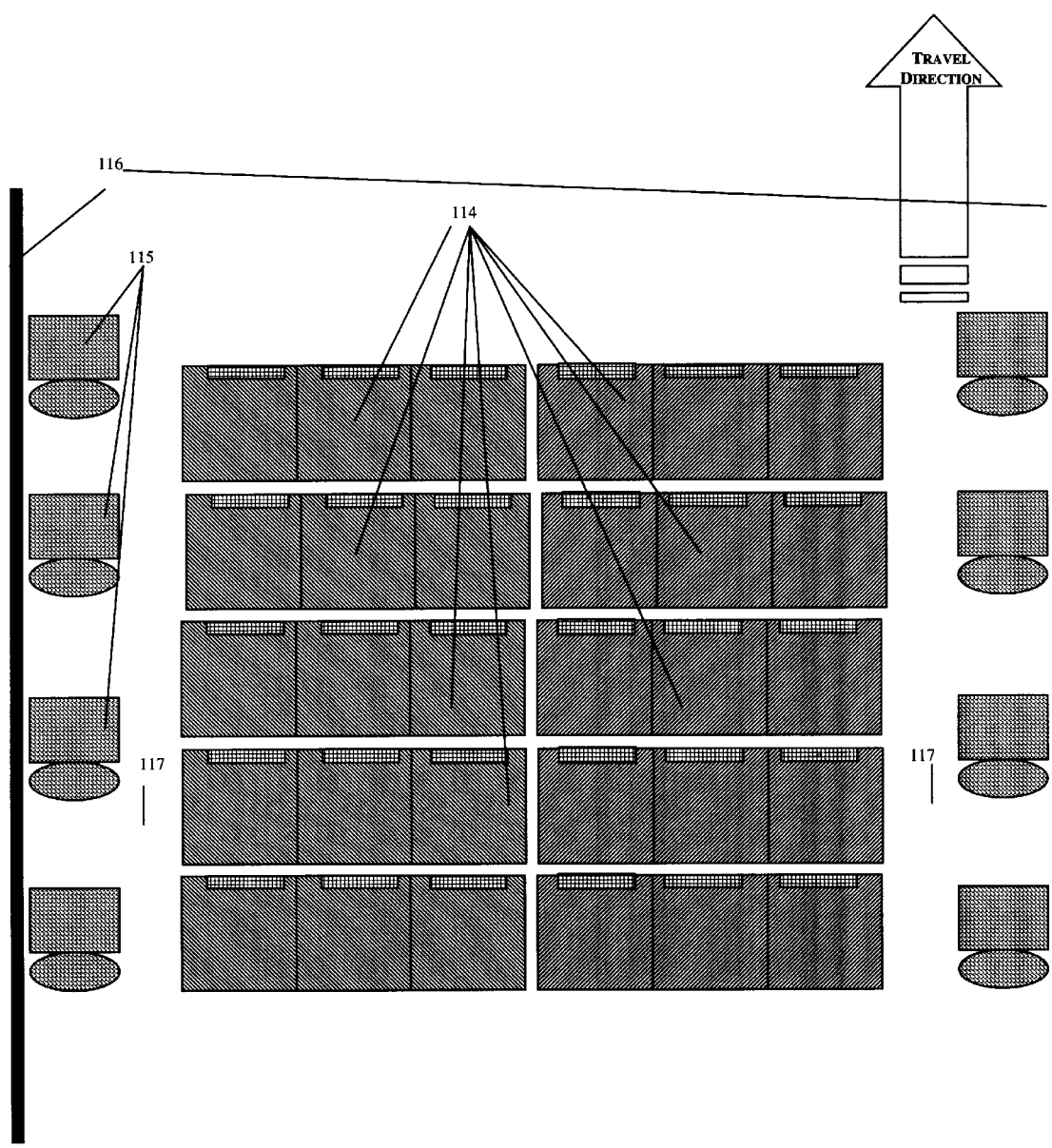
FIG. 3 illustrates the above embodiments with laterally arranged air sleeper stacks relative to the direction of motion of the aircraft.
Figure 6:
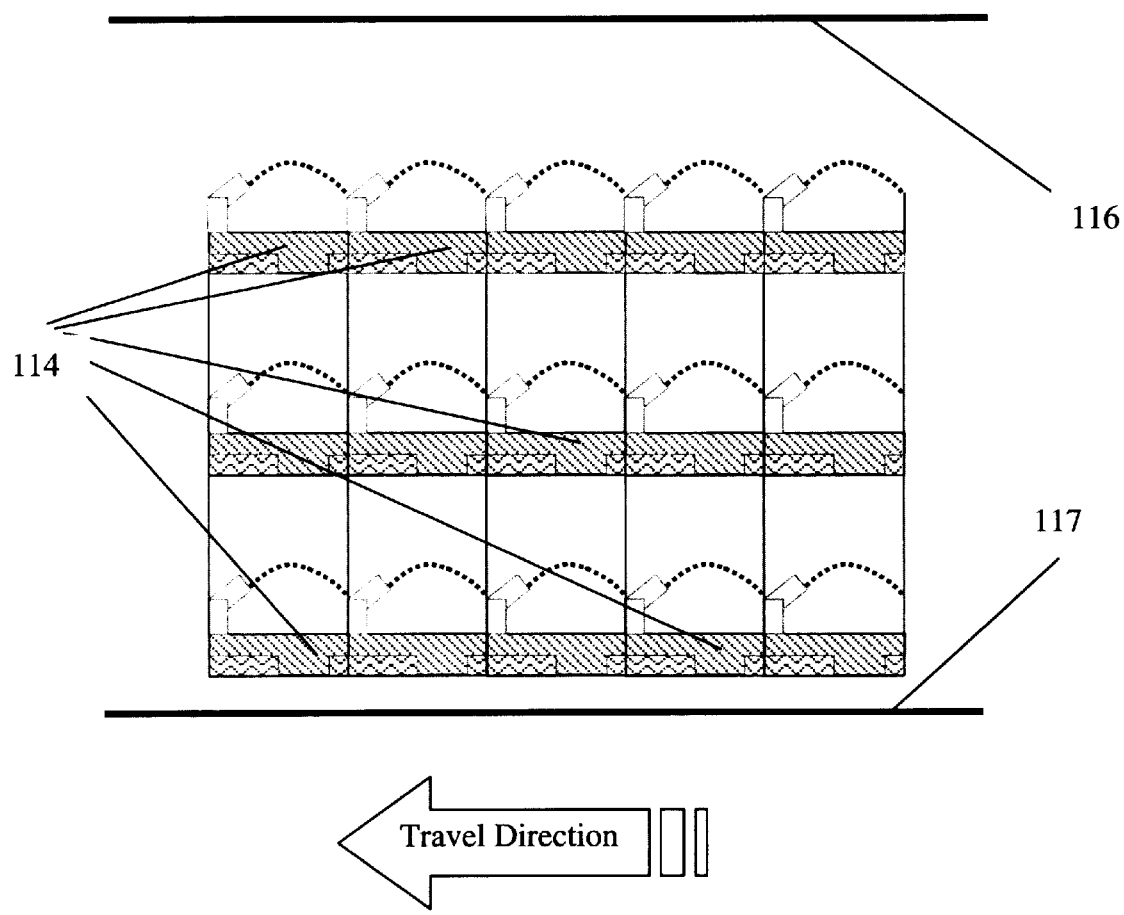
FIG. 6 illustrates both the embodiments in FIGS. 1 and 2 deployed as an air sleeper family showing the orientation of the Bumpers relative to the direction of motion.

An additional embodiment is illustrated in FIG. 6. Here, the configuration of a three tier stack of the Air Sleepers are constructed together to form a Family. The Air Sleepers 114 are configured here in three tiers and in five rows. This is duplicated on the other side (not seen in this elevation view). The ceiling 116 and the floor 117 of the aircraft cabin are shown. This embodiment is illustrated in FIG. 3 as a plan view. Here the air sleepers are arranged as lateral stacks across the aircraft fuselage. The Air Sleepers 114 in this embodiment are laterally deployed. It may be observed that the Safety Bumpers are on the forward side of each of the Air Sleepers to protect passengers in the event of a rapid deceleration when they are in any of the possible positions. There are seats 115 that may be deployed on the side of the aisle to allow passengers an option to sit near a window. This may be a surrogate "Lounge" for Economy Class. First and Second class may have separate lounges. The shell of the aircraft is illustrated in 116 and 117 is floor of the aisle.

An additional embodiment in the Family structure is the incorporation of "family rooms" and "conference rooms" by providing partitions for the privacy of groups of passengers who desire such arrangements. The natural structure of the Air Sleeper facilitates communication among passengers— not simply with adjoining Air Sleepers but those in the opposite row of Air Sleepers as well. This is particularly so in the configuration with internal facing sleepers (feet at the center) as in the preferred embodiment.

This embodiment may be for example Families with three tiers of Air Sleepers, five sleepers long with two Air Sleepers across. The construction permits the removal of such Families from the Aircraft either by engaging slides on the aircraft floor with rollers/wheels or alternative mechanisms. The Air Sleeper Family will in the normal travelling position be locked securely to its mounts on the aircraft. In some embodiments the mounts may be adaptations of multiple floor mounts in conventional passenger aircraft. In some embodiments such mounts may be on the floor and ceiling of the aircraft fuselage. Air Sleeper Families may in some embodiments be constructed from modular components that represent individual Air Sleepers and parts thereof. Such modular components may be assembled to provide several different configurations of Air Sleeper Families.

Figure 4:
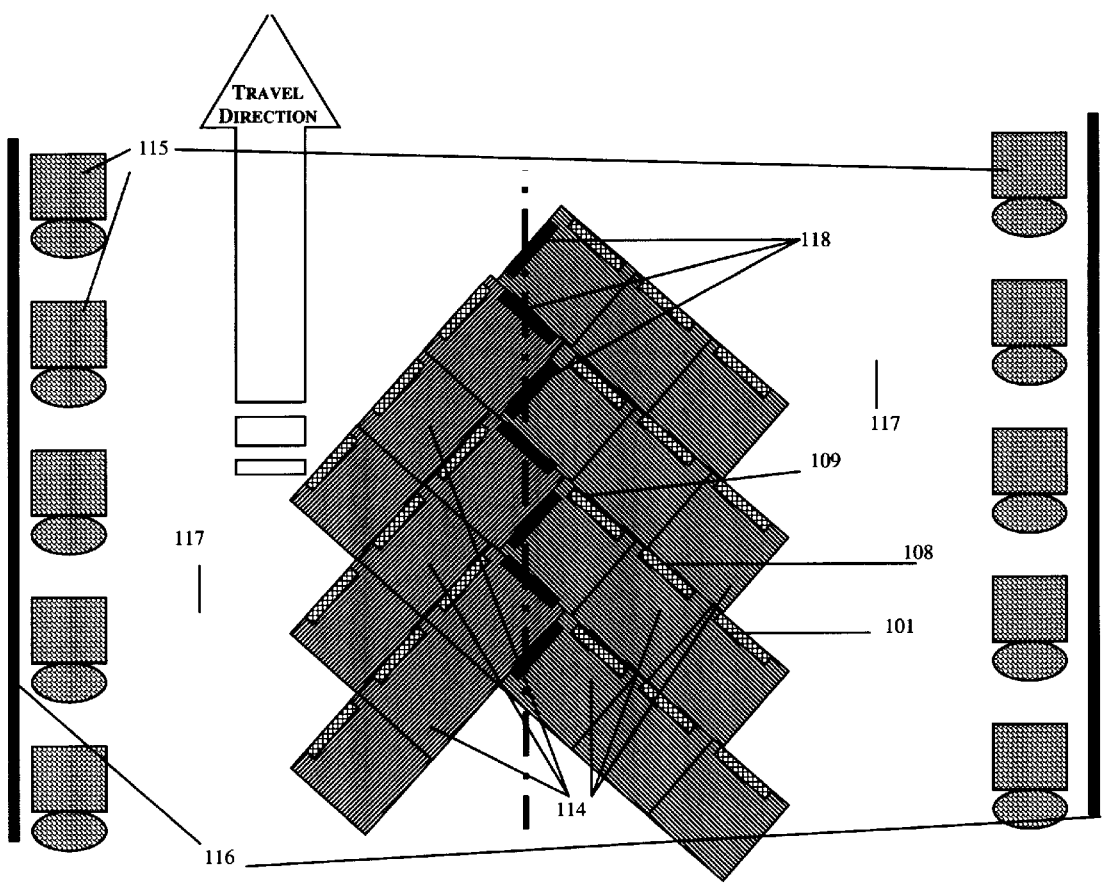
FIG. 4 illustrates the embodiment in FIG. 1 with diagonally arranged air sleepers with passengers facing forwards and inwards.

An alternative additional embodiment is illustrated in FIG. 4. Here, an embodiment with diagonally arranged Air Sleepers with passengers facing forwards is presented. This embodiment may for example be preferable in narrower body aircraft. The Air Sleepers 114 in this embodiment are deployed diagonally but importantly the feet if passengers are towards the inside of the Air Sleeper and the diagonal orientation is such that the feet are further forward of the upper body and head within the aircraft. This ensures that in the event of rapid deceleration the passengers are forced into their airsleepers rather than ejected out of them. Furthermore the pressure in on the feet of the passengers resisted by the foot bumpers 118 in this embodiment, and the side bumpers as in all the embodiments which are in front of the passengers.

In another additional embodiment as shown in FIG. 4, seats 115 may be deployed on the side of the aisle to allow passengers an option to sit near a window. This may be a surrogate "Lounge" for Economy class. First and Second class may have separate lounges. The shell of the aircraft is illustrated in 116 and 117 is the aisle.

In another additional embodiment, "Penthouse" Air Sleepers may be created for the top tier of the air sleepers by providing windows on the upper part of the fuselage. This will give better external views—Particularly suited for chlostrophobic passengers and premium passengers.

An additional embodiment provides for an ejection mechanism for the above Air Sleeper Families in emergencies or at times of crisis as in highjackings, through axial loading doors much more expeditiously than with the conventional exit through emergency exits. Each Family will have in this embodiment integrated safety rafts and parachute systems to be deployed when required.

An additional embodiment provides the containerization of the Air Sleeper. Here the aircraft mounts are designed to accept Air Sleeper Families or cargo containers. In such embodiments the cargo containers or Air Sleeper Families may slide or roll into position and be locked in for transport. This embodiment may utilize some space for cargo containers and other space for Air Sleeper containers to increase capacity utilization. In addition this embodiment has passenger services such as toilets, lounges and galleys that are containerized and loaded and unloaded on to the aircraft, utilizing the optimal configuration of the aircraft for each flight using available resources. Such arrangements will increase the utilization of the aircraft as service modules may be maintained, and prepared for flights "Off Line".

An additional embodiment where a new approach for passenger embarkation and disembarkation is used. Air Sleeper Families are removable from the aircraft and slide or roll into place or out of the aircraft through large axial doors[2]. Such Air Sleeper Families may in some embodiments be boarded in the comfort of airport lounges following security checks. Passengers may then be transported in their Air Sleepers through processing centers for travel formalities and finally transported to the interior of the aircraft where the Air Sleeper Families are locked in place for travel. Transit from one flight to another may be arranged with such a system. Such facilities will increase the passenger handling capacity of equipped airports and increase the time utilization of aircraft. Finally in the event of an airport not having such facilities, passengers may embark and disembark in the conventional way. Such Families may be loaded directly into specially equipped busses trains or to connecting flights. The passenger will as a result have a controlled environment from "door to door". The Air Sleeper families may be boarded and left in special lounges. This arrangement will avoid passengers walking through long corridors and conveyer systems particularly in larger airports.

[2]Similar to Cargo Doors.

An additional embodiment includes baggage facilities attached to the Air Sleeper. Here the baggage of the passenger is stored with each Air Sleeper Family. Some embodiments could store such baggage below or above such Air Sleeper Families but structurally integrated with such Families. Such baggage may as a result be loaded at the time of passenger boarding of the Air Sleeper and removed at the time of disembarkation in the destination airport. This embodiment will make superfluous, the need for baggage check in systems conveyor systems loading systems and separate airport facilities for baggage pick up. This embodiment will provide significant security improvement as baggage may easily be identified with the passengers. Customs operations will also be substantially simplified. The Air Sleeper Families may be wheeled past the customs and Immigration facilities when required, providing ready access to baggage and convenience to passengers who remain in their Air Sleepers until they have completed all their formalities and are ready to leave the terminal. Finally, there will be no wait for baggage pickup, which will result in an increase in the utilization of the airport facilities.

An additional embodiment provides a new alternative business system and related billing approach. Here a new tariff structure that is based on the lounge usage and Air Sleeper usage, rather than fixed classes of travel. This embodiment will have a tariff structure including:

1. A base travel charge for the Air Sleepers. There may be several of these depending on the amenities and comfort provided in these. Such arrangements may be similar to seats in conventional aircraft with three classes of travel.
2. Tariffs can be for the usage of lounges. The lounge facilities may be arranged to attract different premia that the passengers will be prepared to pay for these depending on their preferred socialization group—analogous to the classes of travel.
3. Usage may be measured in time of usage or flat rates for each of the above elements.
4. Charge Cards and EFT arrangements provided for the "pay-as-you-fly" facility.

CONCLUSIONS, RAMIFICATIONS & SCOPE

Thus it will become apparent that the present invention presented, provides a new paradigm for implementing key safety features and providing comfort and utility for passengers in aircraft. This benefit is augmented as the same habitat that is used for the entire flight in the aircraft may be used before and continue to be used after the flight and as a result undisturbed travel in multiple aircraft and or ground transport facilities are made possible with the present invention.

The present invention differs sharply from the background art in that there is no similar arrangement that provides the required safety arrangements to allow a single habitat to be used for multiple means of transport including in particular air transport for passengers, allowing discretionary horizontal sleep postures and still have the same economic utilization of space comparable to the most efficient passenger aircraft configurations.

While the above description provides many specificities, these should not be construed as limitations on the scope of the present invention, but rather as an exemplification of the preferred, an additional and an alternative embodiment thereof. Many other variations are possible.

What is claimed is:

1. A structure providing a habitat for a passenger in a vehicle comprising:
   a) a means of providing said passenger with adjustable physical support capable of attaining both a seated and horizontal sleeping posture; and
   b) a plurality of safety bumpers along one side of said physical support means for providing said passenger adequate safety measures under the severest movements of said vehicle; and
   c) at least one strap attached to each of said bumpers and attached to the side of the physical support means opposite the safety bumpers thereby providing guidance towards and a restraining surface for said passenger's body into the safety bumpers and the physical support means in the event of a rapid horizontal or vertical movement of said vehicle.

2. A strap as in claim 1, wherein said strap is composed of a semi rigid material that provides high tensile strength and has sufficient rigidity to require support only at its connected ends, thereby allowing deployment away from the passengers body in the interest of passenger safety and comfort.

3. A structure as in claim 1, wherein said habitat orients said passenger in a substantially lateral position relative to the motion of the vehicle, and said safety bumpers are located substantially ahead of said passenger relative to the motion of the vehicle and wherein said adjustable physical support means further comprise at least one sleeper section and a plurality of frame and support beams, wherein said sleeper sections are deployed laterally across and under said passenger's body, and pivotally and slidably attached to said plurality of frame and support beams mounted to the vehicle, whereby the hinged and slidably attached sleeper section(s) can be moved at the discretion of said passenger with angular displacements resulting from pivotal mounting and longtitudenal displacements relative to the length of the passenger's habitat resulting from the slidable mounting of said sleeper section(s) to the frame and support beams, to positions of comfort.

4. A structure as in 3, further comprising at least one table top mounted to the frame and support beams of the said habitat, whereby its inclination is maintained horizontal relative to said habitat.

5. A structure as in claim 4, wherein attachment of the said table top to the said frame and support beams is a horizontal sliding mount, whereby said table top can traverse a predetermined length of the said habitat.

6. A structure as in claim 3, wherein there are three sleeper sections arranged along the length of the body of said passenger and each laterally across the body of said passenger wherein two of said sleeper sections are each sleeper end sections, and the other sleeper section is a sleeper middle section, wherein when the passenger lies horizontally on said sleeper sections, the head and upper body are substantially supported by one of the sleeper end sections, the pelvis and the upper leg is substantially supported by the sleeper middle section and the lower leg and feet are substantially supported by the other sleeper end section, while maintaining the passenger in a position entirely within said habitat.

7. A structure as in claim 6, further comprising arm rests constructed to straddle at least one of the two said sleeper end sections but to lie entirely within the said habitat, and each hingedly mounted to said sleeper end sections, thereby permitting said passenger to pivotally raise either of said sleeper end sections by a positive and upward angular displacement relative to the sleeper middle section, while keeping the said arm rests attached to said raised sleeper end section, at a smaller angular displacement from the said sleeper middle section, to provide support for the upper torso and head at a higher level than the arms of said passenger.

8. A structure as in claim 6, wherein the flexibility in orientation of passengers within said habitat is limited, and wherein one of said sleeper end sections is the sleeper upper section and the only other sleeper section is the sleeper lower section.

9. A structure as in claim 1, wherein said physical support means are constructed to support said habitats in a nested arrangement within said vehicle thereby utilizing available space more efficiently within said vehicle.

10. A structure as in claim 9, wherein said habitat is positioned within said nested arrangement, such that each of said passengers has independent access to each of said habitats from areas of the vehicle that include facilities and utility arrangements that are made available in the vehicle for a plurality of passengers, such said independent access being available without incursion into the habitat of any other passengers, thereby not compromising the preferred posture of any other passengers in their respective said habitats, in said vehicle at any time.

11. A structure as in claim 10, wherein said habitats constitute nested arrangements such that said habitats are arranged vertically above one another in a plurality of tiers.

12. A structure as in claim 11, wherein said tiers of habitats are arranged back to back at a predetermined angle, thereby providing greater structural support for said nested arrangements while still providing passengers access to said habitats at each of the two open ends of the resulting arrays of back to back habitats and with the apex of said predetermined angle pointing in the direction of motion of the vehicle, thereby ensuring that in the event of a rapid deceleration of the vehicle said passengers in the said habitats will be transported into their respective habitats rather than ejected out of their respective habitats, resulting in a controlled environment for limiting forces on the bodies of the passengers under such rapid deceleration of the vehicle.

13. A structure as in claim 12, wherein a plurality of said habitats arranged in multiple tiers and back to back to form arrays, are further arranged in a plurality of layers to form families of air sleepers, which are constructed to be independent structural units within the vehicle.

14. A structure as in claim 13, where said family of habitats is mounted on lockable devices that when unlocked, allow movement of the said families within the vehicle and out of the vehicle though doors.

15. A structure as in claim 14, wherein said families with mounted nested habitats may be wheeled on suitable vehicles into and out of at least one of passenger service facilities in airports and other aircraft, whereby passengers may remain in their preferred orientation at all stages of one or more flights and before and thereafter such flights thereby not needing to dismount from their habitats, while conducting all their interactions with travel and other administration official directly from said habitat.

16. A structure as in claim 15, wherein baggage racks for each of the passengers are mounted in the vicinity of said passenger's habitat, thereby facilitating the handling of luggage with passenger movements.

17. A structure as in claim 14, wherein said families of habitats are interchangably mounted in vehicles with container of cargo, and other passenger service facilities including galleys, toilets and lounges.

18. A structure as in claim 14, wherein said families further comprise at least one of systems of parachutes and a safety life raft that will protect the entire said family as an integral unit in emergencies, so that said families may be unlocked and ejected from the vehicle in times of crisis including emergencies.

19. A structure as in claim 13, wherein the relative position s of said habitats within said families are utilized to facilitate communities of passengers to interact face to face and laterally across adjacent habitats, thereby facilitating one or more of the following:
 a) conferences with feet towards the center of said back to back habitats;
 b) party environments with feet towards the center of said habitats;
 c) collaborative work with passengers facing each other with feet at the further ends of said habitats.

20. A structure as in claim 12, wherein said predetermined angle is 180 degrees such that said tiers are arranged in opposing directions across the vehicle.

21. A structure as in claim 12, wherein each habitat has a foot bumper mounted at the inner end of each habitat in each pair of said tiers, that form said arrays, whereby in the event of rapid deceleration of the vehicle, said passengers are supported by said foot bumpers along with said safety bumpers, straps and physical support means.

22. A structure as in claim 11, further comprising windows on the aircraft fuselage above the top habitat of said tiers of habitats, thereby creating a penthouse habitat at the top tier.

23. A structure as in claim 11, further comprising climbing rungs mounted to said frame and support beams, thereby allowing said passengers to climb to the higher habitats in each of said tiers of habitats.

24. A structure as in claim 10, further comprising at least one retractable utility flap positioned at the entrance of the habitat, thereby providing one or more of the following functions:

a) an additional tabletop;

b) a utility seat that is usable when entering said habitat.

25. A structure as in claim 10, further comprising additional areas of the vehicle that are common to passengers called lounges, said lounges providing a range of facilities that passengers desire while traveling.

26. A structure as in claim 25, which further comprises a business system and related billing system that charge passengers for their time in said habitats and time in said lounges, at a time prior to the utilization of said facility in said vehicle, thereby giving passengers the flexibility to choose their travel environment and the related costs.

27. A structure as in claim 1, wherein said vehicle is an aircraft.

28. A structure as in claim 1, further comprising at least one amenities console, comprising at least one of the following functions:

a) independently controllable air supply;

b) video screen;

c) sound headset connection;

d) video headset connection;

e) telephone;

f) video/audio intercom;

g) aircraft status indicators;

h) lights; and i) video conferencing camera and hardware.

\* \* \* \* \*